United States Patent
Bollapalli et al.

(10) Patent No.: US 8,775,610 B2
(45) Date of Patent: Jul. 8, 2014

(54) IDENTIFYING AN APPLICATION SERVER IN A PLURALITY OF APPLICATION SERVERS ASSOCIATED WITH A SHARED IDENTIFIER

(75) Inventors: Nagesh Kumar Bollapalli, Bangalore (IN); Rajeev Gupta, Bangalore (IN)

(73) Assignee: Sonus Networks, Inc., Westford, MA (US)

( * ) Notice: Subject to any disclaimer, the term of this patent is extended or adjusted under 35 U.S.C. 154(b) by 345 days.

(21) Appl. No.: 13/080,387

(22) Filed: Apr. 5, 2011

(65) Prior Publication Data

US 2012/0173711 A1 Jul. 5, 2012

(30) Foreign Application Priority Data

Dec. 30, 2010 (IN) .......................... 3576/MUM/2010

(51) Int. Cl.
 *G06F 15/173* (2006.01)
(52) U.S. Cl.
 USPC ....... 709/224; 709/223; 709/227; 370/395.52
(58) Field of Classification Search
 CPC . H04L 61/157; H04L 61/605; H04L 61/6054; H04L 65/1016; H04L 65/104; H04L 65/1063; H04L 29/08072; H04L 29/06; H04L 43/00
 USPC ....................... 709/224, 223, 227; 370/395.52
 See application file for complete search history.

(56) References Cited

U.S. PATENT DOCUMENTS

| | | | |
|---|---|---|---|
| 6,611,516 B1 * | 8/2003 | Pirkola et al. ................. | 370/352 |
| 2002/0196775 A1 * | 12/2002 | Tuohino et al. ............... | 370/352 |
| 2005/0198215 A1 * | 9/2005 | Helmerich .................... | 709/220 |
| 2006/0142011 A1 * | 6/2006 | Kallio ........................... | 455/445 |
| 2007/0110076 A1 * | 5/2007 | Brouwer et al. .......... | 370/395.52 |
| 2009/0089413 A1 * | 4/2009 | Kamei et al. .................. | 709/223 |
| 2009/0221310 A1 | 9/2009 | Chen et al. .................... | 455/466 |
| 2010/0069101 A1 | 3/2010 | Mahdi et al. .................. | 455/466 |
| 2010/0105379 A1 | 4/2010 | Bonner et al. ................ | 455/433 |

(Continued)

OTHER PUBLICATIONS

3GPP TS 23.078; V9.0.0; $3^{rd}$ Generation Partnership Project; Technical Specification Group Core Network and Terminals; Customized Applications for Mobile network Enhanced Logic (CAMEL) Phase 4; Stage 2 (Release 9); (Dec. 2009); 738 pgs.

(Continued)

*Primary Examiner* — Michael C Lai
(74) *Attorney, Agent, or Firm* — Straub & Pokotylo; Michael P. Straub; Stephen T. Straub

(57) ABSTRACT

Methods and apparatuses, including computer program products, are described for identifying an application server in a plurality of application servers associated with a shared identifier in an Internet Protocol Multimedia Subsystem (IMS) network. The method includes receiving, from a Signaling System 7 (SS7) network, a message including a mobile device identifier associated with a mobile device connected to the IMS network and determining the identity of an application server in the plurality of application servers associated with the shared identifier. The determining step includes extracting the mobile device identifier from the message and retrieving, from a data storage module, an application server identifier associated with an application server based on the extracted mobile device identifier. The application server associated with the retrieved identifier provides service to the mobile device. The method also includes transmitting the message to the application server associated with the retrieved identifier.

20 Claims, 7 Drawing Sheets

(56) References Cited

U.S. PATENT DOCUMENTS

| 2010/0111049 | A1 | 5/2010 | Siegel et al. | 370/336 |
|---|---|---|---|---|
| 2010/0111079 | A1 | 5/2010 | Duffy et al. | 370/352 |
| 2010/0246574 | A1 | 9/2010 | Shi et al. | 370/352 |
| 2011/0191479 | A1* | 8/2011 | Boulanov | 709/227 |

OTHER PUBLICATIONS

3GPP TS 23.204; V9.0.0; $3^{rd}$ Generation Partnership Project; Technical Specification Group Services and System Aspects; Support of Short Message Service (SMS) over generic 3GPP Internet Protocol (IP) access; Stage 2 (Release 9); (Dec. 2009); 37 pgs.

3GPP TS 23.228; V10.1.0; $3^{rd}$ Generation Partnership Project; Technical Specification Group Services and System Aspects; IP Multimedia Subsystem (IMS); Stage 2 (Release 10); (Jun. 2010); 267 pgs.

3GPP TS 24.341; V9.0.0; $3^{rd}$ Generation Partnership Project; Technical Specification Group Core Network and Terminals; Support of SMS over IP networks; Stage 3 (Release 9); (Dec. 2009); 30 pgs.

* cited by examiner

IDENTIFYING AN APPLICATION SERVER IN A PLURALITY OF APPLICATION SERVERS ASSOCIATED WITH A SHARED IDENTIFIER

RELATED APPLICATIONS

This application claims the benefit of and priority to Indian Patent Application No. 3576/MUM/2010, filed on Dec. 30, 2010, filed in the Indian Patent Office. The disclosure of the above application is incorporated herein by reference it its entirety.

FIELD OF THE INVENTION

The subject matter of this application relates generally to methods and apparatuses, including computer program products, for identifying an application server in a plurality of application servers associated with a shared identifier in an Internet Protocol Multimedia Subsystem (IMS) network.

BACKGROUND OF THE INVENTION

An IMS network is an architectural framework for providing Internet Protocol (IP) multimedia services (e.g., Voice-over-IP telephony) to subscribers. The IMS network generally includes three different layers: the application layer, the session layer, and the transport layer. The application layer includes application servers that provide various types of call support services to the subscribers. The session layer (also known as the IMS core network) manages user authentication, user equipment (UE) registration, and routing of signaling and other call-related packets between the application layer and the transport layer. The transport layer includes gateways that interface with various external networks (e.g., PSTN, Internet) and performs call control protocol conversion and transformation.

Various types of Call Session Control Function (CSCF) nodes (e.g., Proxy CSCF, Interrogating CSCF, Serving CSCF) are included as part of the session layer. The Serving CSCF (S-CSCF nodes) are generally configured as the central nodes in the session layer. The S-CSCF nodes perform several aspects of session control including, for example, handling UE registrations, determining to which application server(s) to forward messages, and enforcing policies of the IMS network operator. Any given deployment of an IMS network can include multiple S-CSCF nodes. The particular S-CSCF node that registers the UE of a subscriber is assigned dynamically at the time of UE registration. In addition, all subsequent messages from the UE are routed to the same S-CSCF node using standard IMS procedures.

FIG. 1 is a block diagram illustrating a typical IMS network configuration 100 for providing IP multimedia services to subscribers. The network configuration 100 includes user equipment 102a-b (e.g., mobile phones), a plurality of S-CSCF nodes 104a-c, a plurality of IMS Service Control (ISC) links 106a-b, a multimedia telephony (MMTel) application server pool 108 containing a plurality of MMTel application servers 110a-b, and an IP Short Message Gateway (IP-SM-GW) application server pool 112 including a plurality of IP-SM-GW application servers 114a-b.

In the IMS domain, the actual multimedia service is provided by the application servers in the application layer. Some examples of application servers include MMTel servers (e.g., MMTel servers 110a-b), Presence servers, IP-SM-GW servers (e.g., TP-SM-GW servers 114a-b), and IP Multimedia Service Switching Function (IM-SSF) servers. Nodes such as the MMTel servers 110a-b and Presence servers provide multimedia services to the IMS subscribers and generally do not interact with a Global System for Multimedia Communications (GSM)/3$^{rd}$ Generation Partnership Project (3GPP) network using a Mobile Application Part (MAP)/CAMEL Application Part (CAP) interface.

However, nodes such as the IP-SM-GW servers 114a-b and the IM-SSF server act like SIP application servers towards the session layer. These nodes support SIP messaging toward the IMS core network and also support MAP/CAP messaging towards GSM/3GPP networks. As a result, these nodes must be identifiable to each of the respective IMS and GSM/3GPP networks. To accomplish the identification, the nodes 114a-b are identified by a SIP Uniform Resource Identifier (URI), e.g., an IP Address or Fully Qualified Domain Name (FQDN) in the IMS domain, and by an assigned E.164 number in the GSM/3GPP domain. In other words, the assigned SIP URI is used by the IMS core network to communicate on the SIP interface and the assigned E.164 address is used by the GSM/3GPP network to communicate over the MAP/CAP interface.

Each UE (e.g., UE 102a-b) in an IMS domain is identified by a SIP URI of type sip:<username>@<domain> (e.g., bob@sonusnet.com) and/or a Tel URL (e.g., tel:+91-80-41902629). When the UE 102a-b of a subscriber registers with the IMS network, the particular S-CSCF node 104a-c that will communicate with the UE 102a-b is dynamically assigned. The assigned S-CSCF node (e.g., node 104a), in turn, selects an application server (e.g., MMTel server 110a, IP-SM-GW server 114a, IM-SSF AS) based on initial filter criteria (iFC) associated with the subscriber/UE. The iFC for a subscriber/UE is configured by the network operator at the Home Subscriber Server (HSS) in the session layer of the IMS network. The iFC contains the address of the application server to be contacted, and the application server address can be specified as an IP address or FQDN in the iFC. For example:

If the application server (e.g., IP-SM-GW server 114a) is identified by an IP address—the S-CSCF node (e.g., node 104a) selects the application server 114a using the IP address. In this example, the UE-to-application server mapping is static.

If the application server is (e.g., IP-SM-GW server 114a) identified by a FQDN, the S-CSCF node (e.g., node 104a) resolves the FQDN using Domain Name System (DNS) procedures which return one or more IP addresses. The S-CSCF node 104a selects one of the returned IP addresses to forward SIP requests at the time of third-party UE registration. The S-CSCF node 104a stores the association between the UE (e.g., UE 102a) and the IP address, and forwards all subsequent requests received from the UE 102a to the IP address associated with the application server 114a. In this example, the UE-AS mapping is dynamic and is selected by the S-CSCF node.

In a GSM/3GPP domain, the UE 102a is identified by a Mobile Subscriber Integrated Services Digital Network Number (MSISDN) or an International Mobile Subscriber Identity (IMSI). At least one of the MSISDN and IMSI is contained in MAP/CAP messages associated with a given subscriber/UE. When the UE 102a registers, the subscriber's IMSI is passed to the application server 114a via the ISC link 106b as a part of a third-party registration message (e.g., the message body of an SIP REGISTER message). The application server 114a can also retrieve the MSIDN for the subscriber via the Sh interface.

When a GSM/3GPP network sends a MAP/CAP message intended for a subscriber/UE (e.g., UE 102a), the MAP/CAP message is addressed to the E.164 address of the application server 114a.

> Where the application server is an IP-SM-GW server, the E.164 address is stored in the HLR/HSS for every subscriber. When a subscriber registers with the IMS network, the IP-SM-GW application server registers with the HSS/HLR using the same E.164 number. When the Short Message Service Center (SMSC) does a HLR lookup to deliver a Short Message Service (SMS) message to the subscriber, the E.164 address of the IP-SM-GW application server is retuned to the SMSC.
>
> Where the application server is an IM-SSF server, the GSM Service Control Function (gsmSCF) can invoke operations to establish a new TCAP dialog. For example, CAP-Initiate-Call-Attempt is one such operation which can be used to create a completely new call. The E.164 address is stored in the Service Control Point (SCP) for every subscriber. When the SCP invokes the CAP-Initiate-Call-Attempt operation, the CAP message is addressed to the E.164 address of the IM-SSF server.

FIG. 2 is a block diagram illustrating a typical IMS network configuration 200 for providing IP multimedia services to subscribers, where the application servers (e.g., IP-SM-GW 114a-b) each have an individual E.164 address and an individual IP address. The network configuration 200 includes a Home Location Register (HLR) 202, a Short Message Service Center (SMSC) 202, a plurality of UE 102a-b, a plurality of S-CSCF nodes 104a-c, and an IP-SM-GW application server pool 112 with a plurality of IP-SM-GW nodes 114a-b. It should be understood that the network configuration can also include IM-SSF application servers that are connected to the HLR 202/SMSC 204 and the plurality of S-SCSF nodes 104a-c. Each of the IP-SM-GW nodes 114a-b are assigned an individual E.164 address 206a-b and an individual IP address 208a-b. The iFC of the UE 102a-b can be configured to refer to the IP address 208a-b of an individual IP-SM-GW 114a-b, resulting in a fixed UE to IP-SM-GW application server mapping. In addition, as long as the corresponding E.164 addresses 206a-b are configured in HLR 202, any MAP/CAP messages intended for a given UE 102a-b can be directed toward the same IP-SM-GW application server 114a-b.

However, the network configuration 200 requires that a distinct E.164 address (e.g., addresses 206a-b) is allocated to each of the IP-SM-GW application servers 114a-b. The operator of the network has to intelligently configure each of the subscriber records to distribute registration requests and service appropriately across the application servers, and the operator must configure both the E.164 address 206a-b in HLR 202 and the IP address 208a-b in the iFC at the Home Subscriber Server (HSS). The operator also has to ensure that the IP address 206a-b in the iFC and the E.164 address 208a-b in HLR 202 refer to the same application server 114a-b for a given UE 102a-b. In addition, the operator must allocate a new E.164 address whenever a new application server instance is added to the network and intelligently provision the same against a subscriber. Thus, the operator incurs a provisioning overhead.

FIG. 3 is a block diagram illustrating a typical IMS network configuration 300 for providing IP multimedia services to subscribers, where the application servers 114a-b share a single FQDN 302 and the application servers 114a-b share a single E.164 address 304. The network configuration 300 includes a Home Location Register 202, a Short Message Service Center 204, a plurality of UE 102a-b, a plurality of S-CSCF nodes 104a-c, and an IP-SM-GW application server pool 112 with a plurality of IP-SM-GW nodes 114a-b. It should be understood that the network configuration can also include IM-SSF application servers that are connected to a Service Control Point (SCP) and the plurality of S-SCSF nodes 104a-c. The plurality of IP-SM-GW nodes 114a-b are identified to the plurality of S-CSCF nodes 104a-c by a single FQDN 302. The iFC of the UE 102a-b refers to the FQDN 302 as the address of the application server 114a-b to which the UE 102a-b connects. The S-CSCF node 114a-c selects one of the application servers 114a-b through DNS resolution. The subscriber and UE 102a-b can get allocated to any of the application servers 114a-b via dynamic assignment at the time of registration. To eliminate the provisioning overhead described in relation to FIG. 2, the operator similarly configures the application servers 114a-b to share a single E.164 number 304.

However, when a MAP/CAP message is received from the circuit-switched domain, the IMS network needs to identify the particular application server to direct the message based on where the subscriber and UE is currently registered. As shown in FIG. 3, the network cannot use the E.164 number 304 to identify a distinct application server because all of the application servers 114a-b use the same E.164 number 304. The MAP/CAP messages are meant for a given UE 102a-b and subscriber, and the messages contain the MSISDN and IMSI of the UE 102a-b. Therefore, what is needed is a technique to identify a particular application server in a plurality of application servers, where the plurality of application servers are associated with a shared E.164 identifier.

SUMMARY OF THE INVENTION

In general overview, the techniques described herein are related to identifying an application server in a plurality of application servers associated with a shared identifier in an Internet Protocol Multimedia Subsystem (IMS) network. The techniques advantageously provide for efficient identification and location of a specific application server from among a plurality of application servers where data is received that only identifies the plurality of application servers. By enabling the ability to identify a particular application server without externally disclosing the individual identifiers associated with each of the plurality of application servers, operators of IMS networks can achieve reduced provisioning overhead and increased security associated with the individual servers, leading to more efficient deployment and operation of IMS networks.

The invention, in one aspect, features a method for identifying an application server in a plurality of application servers associated with a shared identifier in an Internet Protocol Multimedia Subsystem (IMS) network. The method includes receiving, at a gateway server from a Signaling System 7 (SS7) network, a message including a mobile device identifier associated with a mobile device connected to the IMS network and determining, by the gateway server, the identity of an application server in the plurality of application servers associated with the shared identifier. The determining step includes extracting, by the gateway server, the mobile device identifier from the message and retrieving, from a data storage module connected to the gateway server, an application server identifier associated with an application server in the plurality of application servers based on the extracted mobile device identifier. The application server associated with the retrieved identifier provides service to the mobile device. The method also includes transmitting, by the gateway server, the message to the application server associated with the retrieved application server identifier.

The invention, in another aspect, features a system for identifying an application server in a plurality of application servers associated with a shared identifier in an Internet Protocol Multimedia Subsystem (IMS) network. The system includes a gateway server in the IMS network connected to a Signaling System 7 (SS7) network. The gateway server is configured to receive, from the Signaling System 7 (SS7) network, a message including a mobile device identifier associated with a mobile device connected to the IMS network and determine the identity of an application server in the plurality of application servers associated with the shared identifier. The determining step includes extracting the mobile device identifier from the message and retrieving, from a data storage module connected to the gateway server, an application server identifier associated with an application server in the plurality of application servers based on the extracted mobile device identifier. The application server associated with the retrieved application server identifier provides service to the mobile device. The gateway server is also configured to transmit the message to the application server associated with the retrieved application server identifier.

The invention, in another aspect, features a computer program product tangibly embodied in a computer readable storage device, for identifying an application server in a plurality of application servers associated with a shared identifier in an Internet Protocol Multimedia Subsystem (IMS) network. The computer program product includes instructions operable to cause a data processing apparatus to receive, from a Signaling System 7 (SS7) network, a message including (i) an identifier associated with a mobile device connected to the IMS network and determine the identity of an application server in the plurality of application servers associated with the shared identifier. The determining step includes extracting the mobile device identifier from the message and retrieving, from a data storage module, an application server identifier associated with an application server in the plurality of application servers based on the extracted mobile device identifier. The application server associated with the retrieved application server identifier provides service to the mobile device. The computer program product also includes instructions operable to cause a data processing apparatus to transmit the message to the application server associated with the retrieved application server identifier.

The invention, in another aspect, features a method for identifying an application server in a plurality of application servers associated with a shared E.164 number in an Internet Protocol Multimedia Subsystem (IMS) network. The method includes receiving, at a gateway server from a Signaling System 7 (SS7) network, a Mobile Application Part (MAP) message or a CAMEL Application Part (CAP) message. The received message includes at least one of a Mobile Subscriber Integrated Services Digital Network Number (MSISDN) or an International Mobile Subscriber Identity (IMSI) associated with a mobile device connected to the IMS network. The method includes determining, by the gateway server, the identity of an application server in the plurality of application servers associated with the shared E.164 number. The determining step includes extracting, by the gateway server, at least one of the Mobile Subscriber Integrated Services Digital Network Number (MSISDN) or the International Mobile Subscriber Identity (IMSI) from the received message and retrieving, by the gateway server from a data storage module, an E.164 number associated with an application server in the plurality of application servers based on at least one of the extracted MSISDN or the extracted IMSI. The application server associated with the retrieved E.164 number provides service to the mobile device. The method also includes transmitting, by the gateway server, the received message to the application server associated with the retrieved E.164 number.

In some embodiments, any of the above aspects can include one or more of the following features. In some embodiments, the mobile device is registered at an application server in the plurality of application servers based on a request for service received from the mobile device when registering with the IMS network and a mapping of the mobile device identifier and the application server identifier associated with the application server receiving the request is stored in the data storage module in response to the registering step. In some embodiments, the message is transmitted from the application server associated with the retrieved application server identifier to the mobile device.

In some embodiments, an E.164 number of another application server is retrieved by the gateway server from the data storage module based on at least one of the MSISDN or IMSI associated with the mobile device when the application server providing service to the mobile device is unavailable. In some embodiments, the gateway server includes an application server locator module. In some embodiments, the application server locator module is located on the same hardware device as the gateway server. In some embodiments, the application server locator module is located on a different hardware device from the gateway server. In some embodiments, the different hardware device is an Interrogating Call Session Control Function (I-CSCF) node in the IMS network. In some embodiments, the application server locator module performs the determining step.

In some embodiments, a Transaction Capabilities Application Part (TCAP) dialog and TCAP transaction identifier associated with the message received from the SS7 network is established between the gateway server and the application server locator module, the message is transmitted from the gateway server to the application server locator module, and the message is transmitted from the application server locator module to the application server associated with the retrieved application server identifier using the established TCAP dialog and TCAP transaction identifier. In some embodiments, the gateway server includes a plurality of application server locator modules.

In some embodiments, one of the plurality of application server locator modules is selected by the gateway server and the message received from the SS7 network is transmitted by the gateway server to the selected application server locator module. In some embodiments, the selected application server locator module performs the determining step. In some embodiments, the message is a Mobile Application Part (MAP) message or a CAMEL Application Part (CAP) message associated with a request to establish a dialog.

In some embodiments, the shared identifier of the plurality of application servers is an E.164 number. In some embodiments, the mobile device identifier includes a telephone number. In some embodiments, the mobile device identifier includes a uniform resource identifier (URI). In some embodiments, the mobile device identifier includes a Mobile Subscriber Integrated Services Digital Network Number (MSISDN), an International Mobile Subscriber Identity (IMSI), or both. In some embodiments, the data storage module is a Home Subscriber Server (HSS), a Lightweight Directory Access Protocol (LDAP) server, a local database, or a locally provisioned data module in the gateway server. In some embodiments, the gateway server includes one or more logical gateway server modules.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
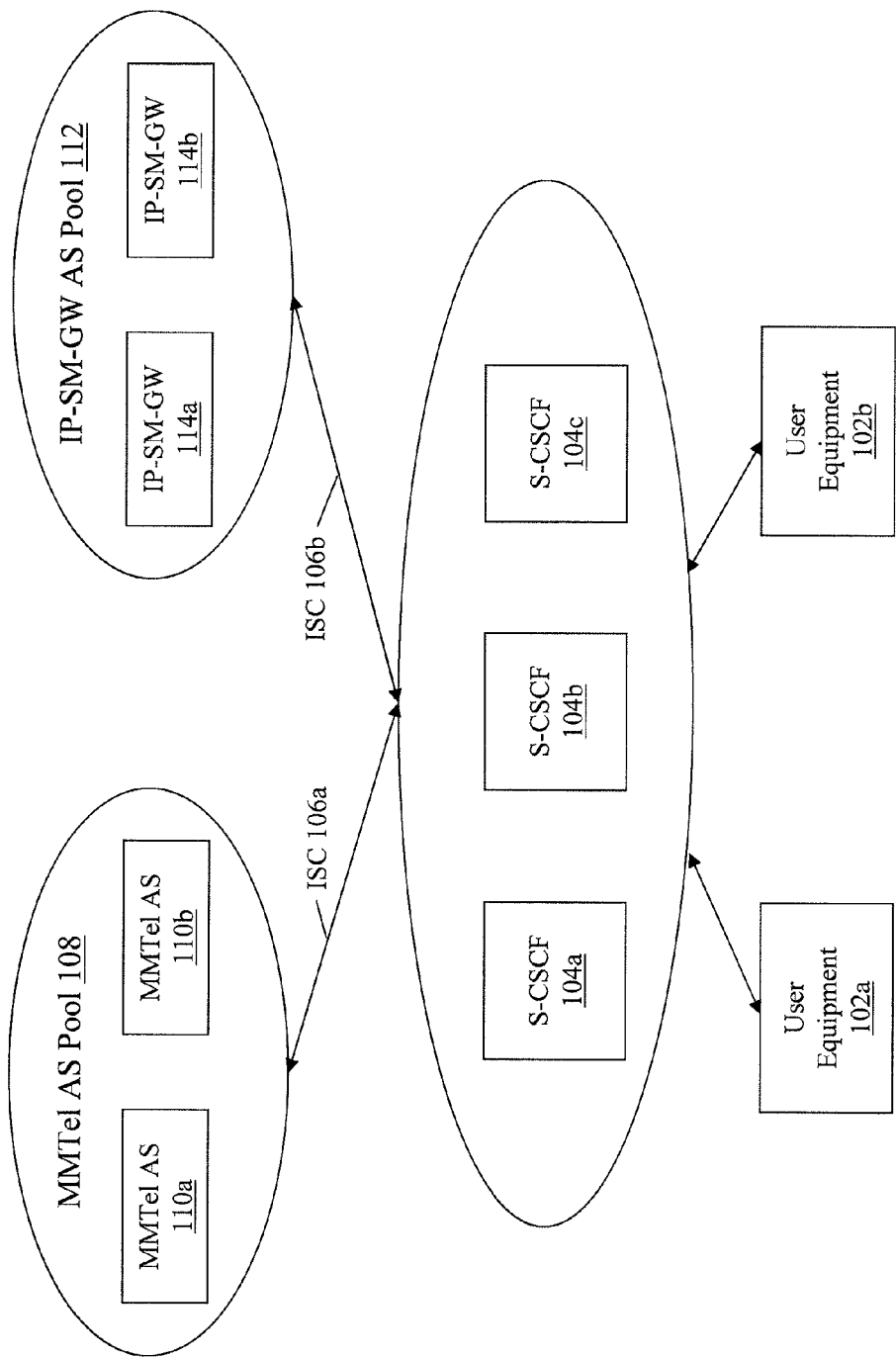
FIG. 1 is a block diagram illustrating a typical IMS network configuration for providing IP multimedia services to subscribers.
Figure 2:
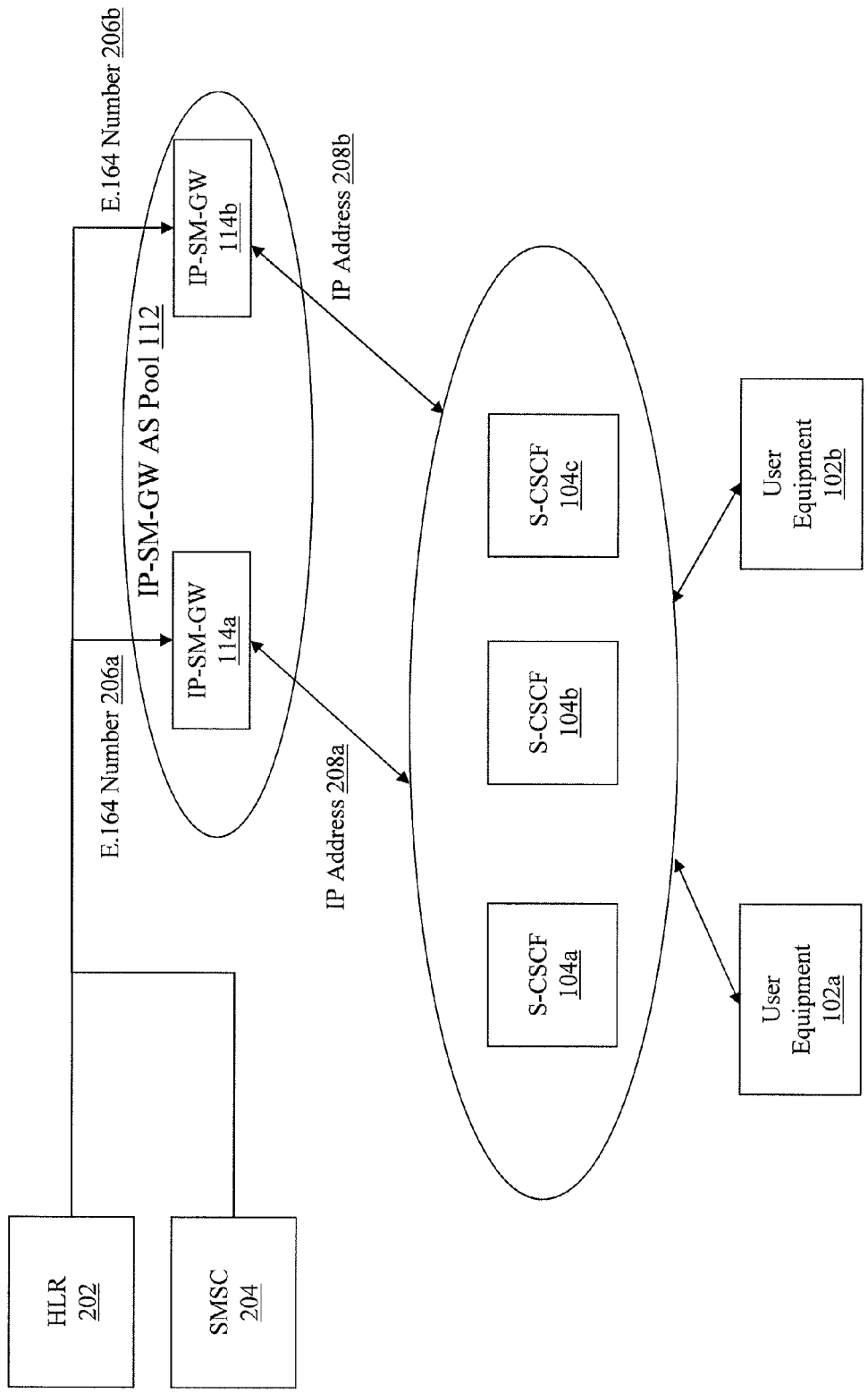
FIG. 2 is a block diagram illustrating a typical IMS network configuration for providing IP multimedia services to subscribers, where the application servers each have an individual E.164 address and an individual IP address.
Figure 3:
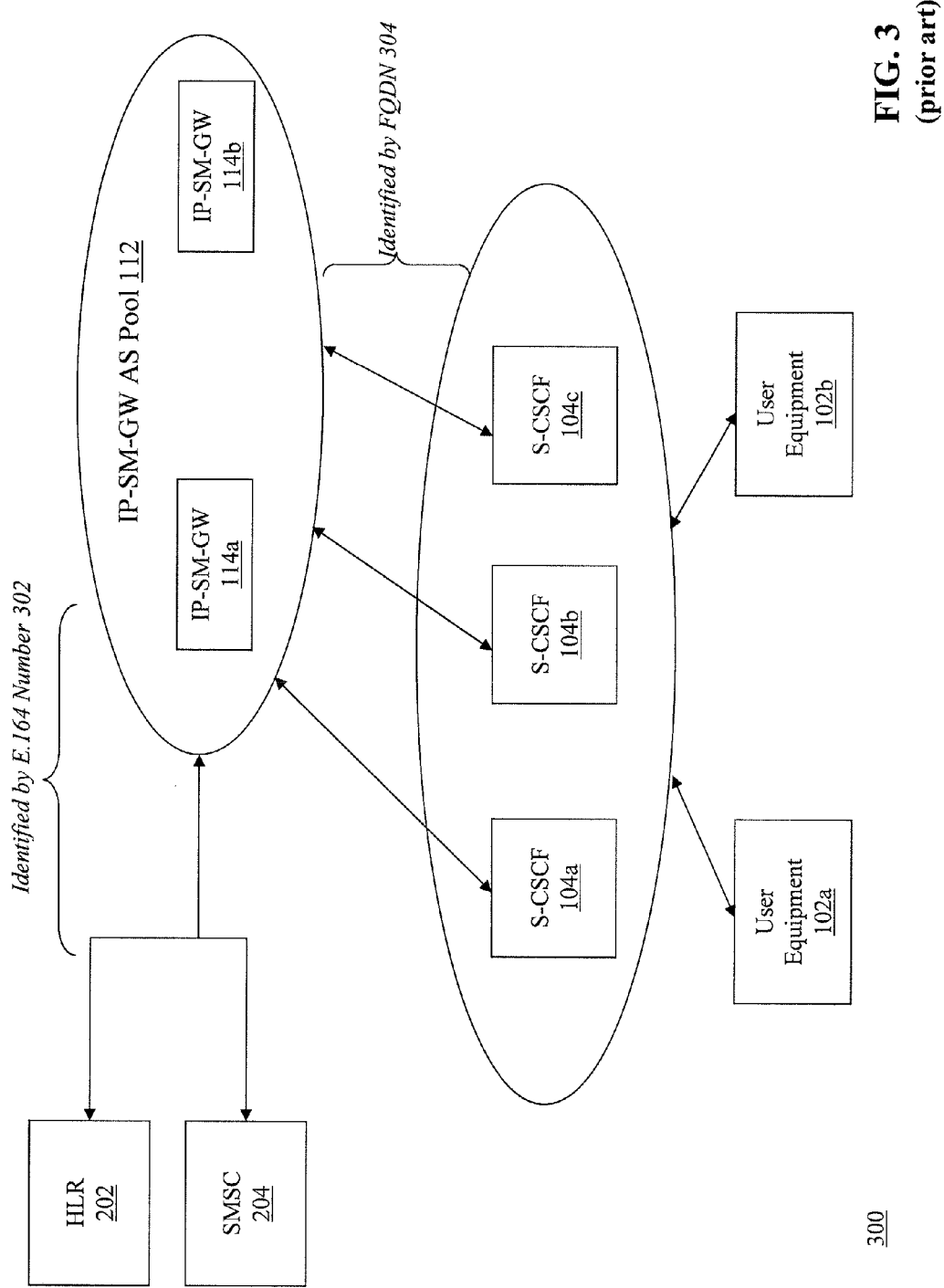
FIG. 3 is a block diagram illustrating a typical IMS network configuration for providing IP multimedia services to subscribers, where the application servers share a single FQDN and each application server has an individual E.164 address.
Figure 4:
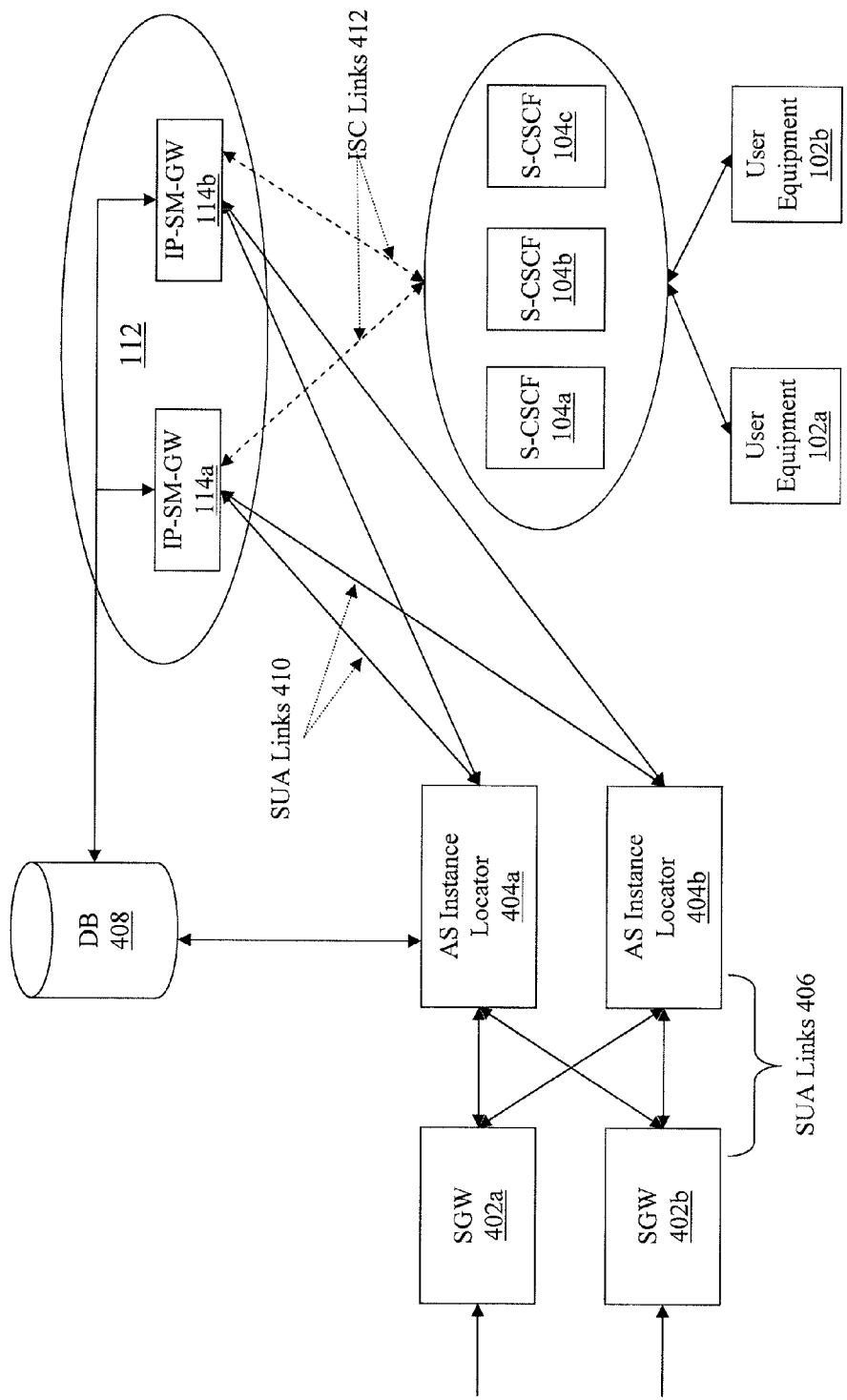
FIG. 4 is a block diagram illustrating an IMS network configuration for identifying an application server in a plurality of application servers associated with a shared identifier in an IMS network.

FIG. 4 is a block diagram illustrating an IMS network configuration 400 for identifying an application server in a plurality of application servers associated with a shared identifier in an IMS network. The network configuration 400 includes a plurality of signaling gateway (SGW) modules 402a-b, a plurality of application server (AS) instance locator modules 404a-b, SCCP User Adaptation (SUA) links 406 connecting the SGW modules 402a-b and the AS instance locator modules 404a-b, a database 408, a plurality of UE 102a-b, a plurality of S-CSCF nodes 104a-c, an IP-SM-GW application server pool 112 including a plurality of IP-SM-GW application servers 114a-b, SUA links 410 connecting the AS instance locator modules 404a-b and the plurality of IP-SM-GW nodes 114a-b, and ISC links 106a-b connecting the plurality of S-CSCF nodes 104a-b and the IP-SM-GW application server pool 112.

In some embodiments, the SGW modules 402a-b are hardware and/or software modules (e.g., implemented on a processor or other computing device) that receive data from a separate network and transmit the data to one or more of the AS instance locator modules 404a-b. In some embodiments, the AS instance locator modules 404a-b are hardware and/or software modules (e.g., implemented on a processor or other computing device) that receive data from the SGW modules 402a-b and determine which application server 114a-b is servicing the UE 102a-b to which the data is directed. While the SGW modules 402a-b and the AS instance locator modules 404a-b are represented in FIG. 4 as separate entities, they can reside on a single physical computing device. For example, the SGW modules 402a-b and the AS instance locator modules 404a-b can be co-located on the same hardware device. In another example, the AS instance locator modules 404a-b can be co-located with an I-CSCF node in the IMS network. Although FIG. 4 shows two SGW modules 402a-b and two AS instance locator modules 404a-b, there can be any number of SGW modules and AS instance locator modules in the configuration 400.

In some embodiments, the database 408 is a hardware and/or software module (e.g., implemented on a processor or other computing device) that stores data received from the application servers 114a-b and retrieves stored data upon request from the AS instance locator modules 404a-b. The database 408 can be located on a separate computing device (e.g., a Home Subscriber Server (HSS), a Lightweight Directory Access Protocol (LDAP) server) from the other components of the network configuration 400. The database 408 can be located in the same physical or logical module as the other components of the network configuration 400 (e.g., a local database, a locally provisioned data module on the gateway server or the AS instance locator module).

The components and/or devices can communicate via a communications network, such as, for example, a local network (e.g., LAN) or a wide area network (e.g, Internet). One of ordinary skill in the art will understand that the techniques described herein can be implemented on many different server types or computing devices without departing from the spirit or scope of the invention.

UE Registration

Still referring to FIG. 4, when a UE (e.g., UE 102a) registers with the IMS network, the network dynamically assigns an S-CSCF node (e.g., node 104a) to the UE 102a. The S-CSCF node 104a retrieves iFC associated with the subscriber/UE 102a from the HLR, and transmits a third-party registration message to a particular application server (e.g., application server 114a) identified in the iFC on behalf of the UE 102a. In some embodiments, the third-party registration message includes the IMSI of the UE 102a. In some embodiments, the application server 114a learns the MSISDN of the UE 102a via the Sh interface using User Data Request (UDR)-User Data Answer (UDA) messages.

The application server 114a transmits the MSISDN and IMSI of the UE 102a and the E.164 address of the selected application server 114a to database 408. The database 408 stores a mapping of the MSISDN, IMSI, and E.164 address. The IMS network can use the mapping to route incoming MAP/CAP messages.

Application Server Instance Identification

Figure 5:
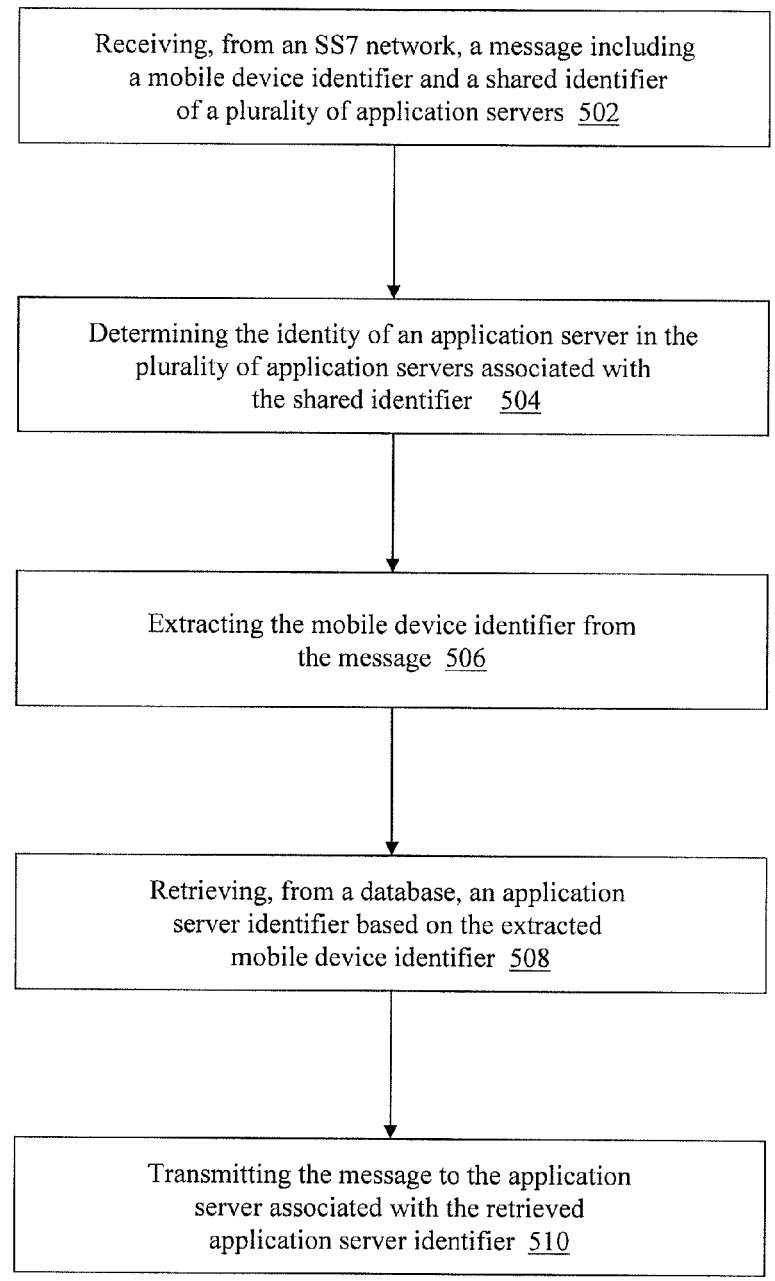
FIG. 5 is a flow diagram of a process for identifying an application server in a plurality of application servers associated with a shared identifier in an IMS network.

FIG. 5 is a flow diagram of a process 500 for identifying an application server in a plurality of application servers associated with a shared identifier in an IMS network utilizing the network configuration 400 of FIG. 4.

The SGW modules 402a-b receive (502) messages (e.g., MAP/CAP messages) from a circuit-switched network (e.g., Signaling System 7 network). The received messages are intended for UE 102a-b in the IMS network, and the messages include at least one identifier associated with the UE 102a-b (e.g., MSISDN, IMSI). The messages also include an E.164 number that has been allocated to the application server pool (e.g., IP-SM-GW pool 112).

The SGW modules 402a-b transmit the received messages to the AS instance locator modules 404a-b. For example, the SGW module 402a that receives the messages can select an AS instance locator module 404a using a round-robin technique (e.g., for load balancing purposes). The selected AS instance locator module 404a determines (504) the identity of an application server 114a that has been assigned to the destination UE 102a by extracting (506) the UE identifier(s) from the messages. Once the module 404a has the UE identifier(s), the module 404a retrieves (508), from the database 408, the E.164 number of the particular application server 114a assigned to the destination UE 102a by using the previously-stored mapping. The module 404a then transmits (510) the messages to the identified application server 114a using the retrieved E.164 number.

For example, if the AS instance locator module 404a extracts (506) an MSISDN of the destination UE 102a from the MAP/CAP message, the module 404a retrieves (508) the E.164 number of an application server 114a from the database 408 by looking up the mapping that contains the extracted MSISDN. In some embodiments, the database 408 may not contain an active mapping with the extracted MSISDN. The AS instance locator module 404a can select a random application server. The same workflow can be used when the UE identifier encoded in the MAP/CAP message is an IMSI.

Figure 6:
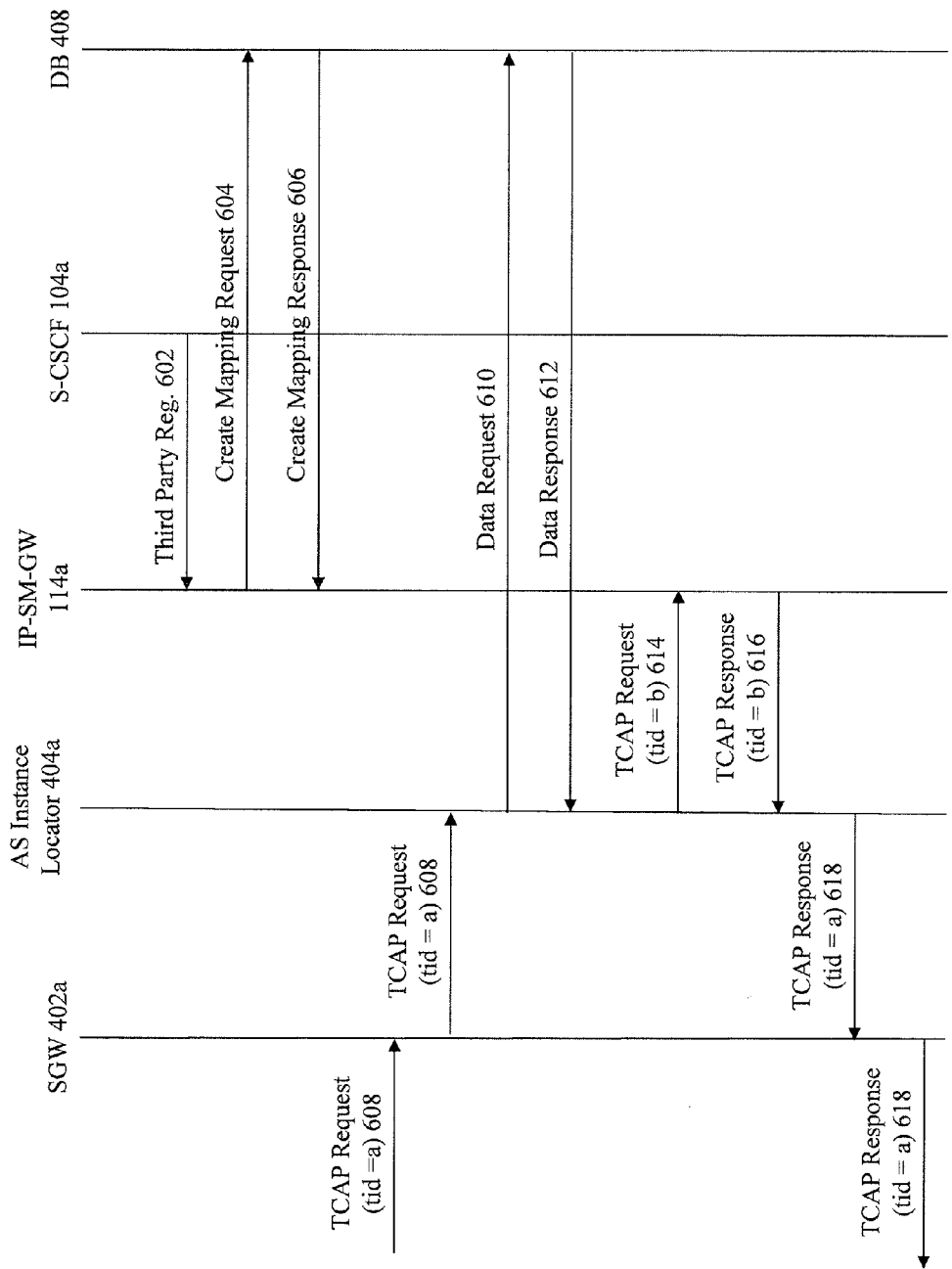
FIG. 6 is a sequence diagram of a process for identifying an application server in a plurality of application servers associated with a shared identifier in an IMS network using TCAP proxy.

FIG. 6 is a sequence diagram of a process 600 for identifying an application server 114a in a plurality of application servers associated with a shared identifier in an IMS network with the AS instance locator 404a acting as a Transaction Capabilities Application Part (TCAP) proxy. TCAP is a protocol used by Signaling System 7 networks that facilitates multiple concurrent dialogs between nodes or sub-systems, using Transaction IDs to differentiate the concurrent dialogs. A TCAP proxy is a logical component that resides between two TCAP-enabled nodes, divides the transaction between them into two transactions, and mediates all TCAP signaling between the nodes. A TCAP proxy is useful for hiding network internals and for load balancing.

As shown in FIG. 6, the S-CSCF node 104a receives a third-party registration request 602 (e.g., from UE). The S-CSCF node 104a retrieves iFC of the subscriber/UE to determine an E.164 address associated with the application server receiving the request 602, and transmits the third-party registration request 602 to IP-SM-GW application server 114a. The IP-SM-GW application server 114a obtains the identifier of the UE (e.g., MSISDN, IMSI) from the request 602 and transmits a create mapping request 604 to database 408, which stores a mapping of the mobile device identifier and the E.164 address of the application server 114a. The database 408 returns a create mapping response 606, acknowledging to the IP-SM-GW application server 114a that the mapping has been created and stored.

In some embodiments, the ability to store and retrieve mapping data allows the AS instance locator module 404a-b to refine the distribution of TCAP requests. At the time of creating a mapping in the database, the application server 114a can store one or more additional E.164 addresses of different application servers (e.g., application server 114b). The AS instance locator module 404a can then use the additional E.164 address information to transmit TCAP requests to other application servers if the originally-selected application server 114a is not available.

The SGW module 402a receives a TCAP request 608 from an external network (e.g., SS7 network). The TCAP request 608 includes a transaction ID of 'a', referencing the dialog established between the SS7 network and the SGW module 402a. The SGW module 402a transmits the TCAP request 608 to the AS instance locator module 404a without modifying the transaction ID. The AS instance locator module 404a extracts a mobile device identifier from the TCAP request 608, and issues to the database 408 a data request 610 which includes the mobile device identifier. The database 408 uses the mobile device identifier to look up the associated mapping and retrieve the E.164 number of the application server 114a to which the TCAP request is to be transmitted. The database 408 returns a data response 612 which includes the retrieved E.164 number.

In some embodiments, the AS instance locator module 404a stores a mapping of the TCAP dialog transaction ID (e.g., 'a') and the identified application server 114a (e.g., E.164 number) in a locally provisioned data module. The AS instance locator module 404a and SGW module 402a can use the locally stored mapping to forward subsequent messages arriving on the same TCAP dialog (e.g., transaction ID 'a') without requiring the AS instance locator module 404a or the SGW module 402a to perform another look up of the mobile device identifier and retrieval of the E.165 number from database 408.

Using the retrieved E.164 number, the AS instance locator module 404a transmits a TCAP request 614 to the IP-SM-GW application server 114a corresponding to the E.164 number. The TCAP request 614 includes a transaction ID of 'b', referencing the dialog established between the AS instance locator module 404a and the application server 114a. The application server 114a returns to the AS instance locator module 404a a TCAP response 616 with the same transaction ID of 'b'.

The AS instance locator module 404a transmits a TCAP response 618 to the SGW module 402a. The TCAP response 618 includes a transaction ID of 'a', corresponding to the earlier TCAP request 608 received from the SS7 network. The SGW module 402a transmits the TCAP response 618 to the SS7 network.

Figure 7:
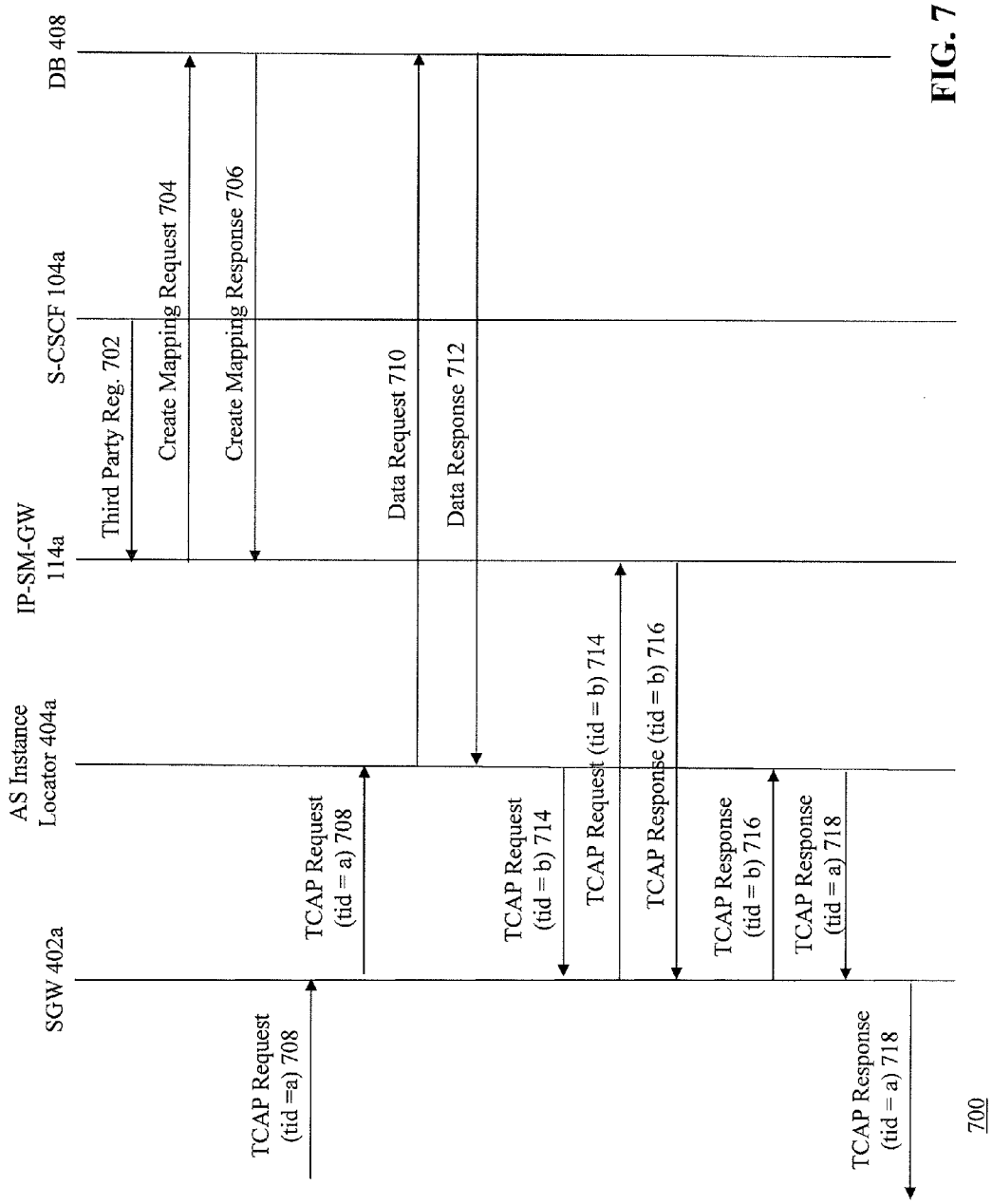
FIG. 7 is a sequence diagram of a process for identifying an application server in a plurality of application servers associated with a shared identifier in an IMS network using TCAP proxy and redirection using the signaling gateway.

FIG. 7 is a sequence diagram of a process 700 for identifying an application server 114a in a plurality of application servers associated with a shared identifier in an IMS network using TCAP proxy and redirection using the signaling gateway (e.g., SGW module 402a).

As shown in FIG. 7, the S-CSCF node 104a receives a third-party registration request 702 (e.g., from UE). The S-CSCF node 104a retrieves iFC of the subscriber/UE to determine an E.164 address associated with the application server receiving the request 702, and transmits the third-party registration request 702 to IP-SM-GW application server 114a. The IP-SM-GW application server 114a obtains the identifier of the UE (e.g., MSISDN, IMSI) from the request 702 and transmits a create mapping request 704 to database 408, which stores a mapping of the mobile device identifier and the E.164 address of the application server 114a. The database 408 returns a create mapping response 706, acknowledging to the IP-SM-GW application server 114a that the mapping has been created and stored.

The SGW module 402a receives a TCAP request 708 from an external network (e.g., SS7 network). The TCAP request 708 includes a transaction ID of 'a', referencing the dialog established between the SS7 network and the SGW module 402a. The SGW module 402a transmits the TCAP request 708 to the AS instance locator module 404a without modifying the transaction ID. The AS instance locator module 404a extracts a mobile device identifier from the TCAP request 708, and issues to the database 408 a data request 710 which includes the mobile device identifier. The database 408 uses the mobile device identifier to look up the associated mapping and retrieve the E.164 number of the application server 114a to which the TCAP request is to be transmitted. The database 408 returns a data response 712 which includes the retrieved E.164 number.

Using the retrieved E.164 number, the AS instance locator module 404a transmits a TCAP request 714 back to the SGW module 402a. The TCAP request 714 includes a transaction ID of 'b', referencing the dialog established between the AS instance locator module 404a and the SGW module 402a. The SGW module 402a transmits the TCAP request 714 to the IP-SM-GW application server 114a. The application server 114a returns to the SGW module 402a a TCAP response 716 with the same transaction ID of 'b', and the SGW module 402a transmits the TCAP response 716 back to the AS instance locator module 404a.

The AS instance locator module 404a transmits a TCAP response 718 to the SGW module 402a. The TCAP response 718 includes a transaction ID of 'a', corresponding to the earlier TCAP request 708 received from the SS7 network. The SGW module 402a transmits the TCAP response 718 to the SS7 network.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP)), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to- Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A method for use in an Internet Protocol Multimedia Subsystem (IMS) network, the method comprising:
   receiving, at a gateway server from a Signaling System 7 (SS7) network, a message including an E.164 number, said E.164 number being a shared identifier associated with a plurality of application servers in the IMS network, and at least one of a Mobile Subscriber Integrated Services Digital Network Number (MSISDN) or an International Mobile Subscriber Identity (IMSI) associated with a mobile device connected to the IMS network;
   identifying, by the gateway server, an identity of an application server in the plurality of application servers associated with the shared identifier, the identifying comprising:
     extracting, by the gateway server, at least one of the MSISDN or the IMSI from the message; and
     retrieving, from a data storage module connected to the gateway server, an application server identifier associated with an application server in the plurality of application servers based on the at least one of the extracted MSISDN or the extracted IMSI, wherein the application server associated with the retrieved application server identifier provides service to the mobile device;
   transmitting, by the gateway server, the message to the application server associated with the retrieved application server identifier; and
   transmitting, from the application server associated with the retrieved application server identifier, the message to the mobile device.

2. The method of claim 1, further comprising:
   registering, at an application server in the plurality of application servers, the mobile device based on a request for service received from the mobile device when registering with the IMS network; and
   storing, in the data storage module, a mapping of (i) the at least one of said MSISDN or said IMSI associated with the mobile device and (ii) the application server identifier associated with the application server receiving the request, in response to the registering step.

3. The method of claim 1, wherein the gateway server includes an application server locator module.

4. The method of claim 3, wherein the application server locator module is located on the same hardware device as the gateway server.

5. The method of claim 3, wherein the application server locator module is located on a different hardware device from the gateway server.

6. The method of claim 5, wherein the different hardware device is an Interrogating Call Session Control Function (I-CSCF) node in the IMS network.

7. The method of claim 3, wherein the application server locator module performs the identifying step.

8. The method of claim 3, further comprising:
   establishing, between the gateway server and the application server locator module, a Transaction Capabilities Application Part (TCAP) dialog and TCAP transaction identifier associated with the message received from the SS7 network;
   transmitting, from the gateway server to the application server locator module, the message; and
   transmitting, from the application server locator module to the application server associated with the retrieved application server identifier, the message using a new TCAP dialog and TCAP transaction identifier.

9. The method of claim 1, wherein the gateway server includes a plurality of application server locator modules.

10. The method of claim 9, further comprising:
    selecting, by the gateway server, one of the plurality of application server locator modules; and
    transmitting, by the gateway server, the message received from the SS7 network to the selected application server locator module.

11. The method of claim 10, wherein the selected application server locator module performs the identifying step.

12. The method of claim 1, wherein the message is a Mobile Application Part (MAP) message or a CAMEL Application Part (CAP) message associated with a request to establish a dialog.

13. The method of claim 1, wherein the at least one of said MSISDN or said IMSI associated with the mobile device includes a telephone number.

14. The method of claim 1, wherein the at least one of said MSISDN or said IMSI associated with the mobile device includes a uniform resource identifier (URI).

15. The method of claim 1, wherein the at least one of said MSISDN or IMSI associated with the mobile device includes both said MSISDN and said IMSI.

16. The method of claim 1, wherein the data storage module is a Home Subscriber Server (HSS), a Lightweight Directory Access Protocol (LDAP) server, a local database, or a locally provisioned data module in the gateway server.

17. The method of claim 1, wherein the gateway server comprises one or more logical gateway server modules.

18. A system including a gateway server and a plurality of application servers for use in an Internet Protocol Multimedia Subsystem (IMS) network, the system comprising:
    the gateway server in the IMS network connected to a Signaling System 7 (SS7) network, the gateway server including one or more processors configured to:
      receive, from SS7 network, a message including an E.164 number, said E.164 number being a shared identifier associated with the plurality of application servers in the IMS network, and at least one of a Mobile Subscriber Integrated Services Digital Network Number (MSISDN) or an International Mobile Subscriber Identity (IMSI) associated with a mobile device connected to the IMS network;

identify an identity of an application server in the plurality of application servers associated with the shared identifier, the identifying comprising:

extracting the at least one of the MSISDN or the IMSI from the message; and retrieving, from a data storage module connected to the gateway server, an application server identifier associated with an application server in the plurality of application servers based on the at least one of the extracted MSISDN or the extracted IMSI, wherein the application server associated with the retrieved application server identifier provides service to the mobile device; and transmit the message to the application server associated with the retrieved application server identifier; and wherein the application server associated with the retrieved application server identifier includes one or more processors configured to:

transmit, from the application server, the message to the mobile device.

19. A system comprising a first non-transitory computer readable storage medium and a second non-transitory computer readable storage medium for use in an Internet Protocol Multimedia Subsystem (IMS) network, the first non-transitory computer readable storage medium including instructions when executed cause a data processing apparatus to:

receive, from the Signaling System 7 (SS7) network, a message including an E.164 number, said E.164 number being a shared identifier associated with a plurality of application servers in the IMS network, and at least one of a Mobile Subscriber Integrated Services Digital Network Number (MSISDN) or an International Mobile Subscriber Identity (IMSI) associated with a mobile device connected to the IMS network;

identify an identity of an application server in the plurality of application servers associated with the shared identifier, the identifying comprising:

extracting the at least one of the MSISDN or the IMSI from the message; and retrieving, from a data storage module, an application server identifier associated with an application server in the plurality of application servers based on the at least one of the extracted MSISDN or the extracted IMSI, wherein the application server associated with the retrieved application server identifier provides service to the mobile device; and transmit the message to the application server associated with the retrieved application server identifier; and the second non-transitory computer readable storage medium including instructions when executed cause the application server associated with the retrieved application server identifier to transmit, from the application server, the message to the mobile device.

20. A method for identifying an application server in a plurality of application servers associated with a shared identifier in an Internet Protocol Multimedia Subsystem (IMS) network, the method comprising:

receiving, at a gateway server from a Signaling System 7 (SS7) network, a message including the shared identifier and at least one of a Mobile Subscriber Integrated Services Digital Network Number (MSISDN) or an International Mobile Subscriber Identity (IMSI) associated with a mobile device connected to the IMS network;

identifying, by the gateway server, an identity of an application server in the plurality of application servers associated with the shared identifier, the identifying comprising:

extracting, by the gateway server, at least one of the MSISDN or the IMSI from the message; and retrieving, from a data storage module connected to the gateway server, an application server identifier associated with an application server in the plurality of application servers based on at least one of the extracted MSISDN or the extracted IMSI, wherein the application server associated with the retrieved application server identifier provides service to the mobile device;

retrieving, by the gateway server from the data storage module, an E.164 number of another application server based on at least one of the MSISDN or IMSI associated with the mobile device when the application server providing service to the mobile device is unavailable; and transmitting, by the gateway server, the message to the application server associated with the retrieved application server identifier.

* * * * *